United States Patent
Schmidt et al.

(10) Patent No.: US 9,849,966 B2
(45) Date of Patent: Dec. 26, 2017

(54) FUSELAGE STRUCTURE FOR ACCOMMODATING TAILS AND CANARDS OF DIFFERENT SIZES AND SHAPES

(71) Applicant: The Boeing Company, Chicago, IL (US)

(72) Inventors: Gregory M. Schmidt, Lake Forest Park, WA (US); Samuel Thomas Walton, Seattle, WA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 14/975,115

(22) Filed: Dec. 18, 2015

(65) Prior Publication Data

US 2017/0174311 A1  Jun. 22, 2017

(51) Int. Cl.
 *B64C 1/26* (2006.01)
 *B64C 39/12* (2006.01)
 *B64C 3/18* (2006.01)

(52) U.S. Cl.
 CPC .............. *B64C 1/26* (2013.01); *B64C 3/185* (2013.01); *B64C 39/12* (2013.01)

(58) Field of Classification Search
 CPC ............ B64C 1/26; B64C 3/185; B64C 39/12
 See application file for complete search history.

(56) References Cited

U.S. PATENT DOCUMENTS

| | | | |
|---|---|---|---|
| 4,417,708 A | 11/1983 | Negri | |
| 4,427,168 A | 1/1984 | McKinney et al. | |
| 5,692,704 A | 12/1997 | Buttgereit et al. | |
| 6,070,831 A | 6/2000 | Vassiliev et al. | |
| 6,314,630 B1 | 11/2001 | Munk et al. | |
| 6,729,577 B2 | 5/2004 | Morgenstern | |
| 7,887,009 B2 | 2/2011 | Keeler, Jr. et al. | |
| 8,746,616 B2 | 6/2014 | Barmichev et al. | |
| 2011/0036941 A1 | 2/2011 | Cazals et al. | |
| 2012/0292435 A1 | 11/2012 | Karem | |
| 2014/0131511 A1 | 5/2014 | Fuertes et al. | |

FOREIGN PATENT DOCUMENTS

| | | |
|---|---|---|
| CN | 103625631 A | 3/2014 |
| DE | 102005003297 A1 | 7/2006 |
| EP | 2441669 A2 | 4/2012 |

OTHER PUBLICATIONS

Search Report for related European Application No. EP16190299.4; report dated May 24, 2017.

*Primary Examiner* — Justin M Benedik
(74) *Attorney, Agent, or Firm* — Miller, Matthias & Hull LLP

(57) ABSTRACT

An aircraft includes a fuselage with structural interfaces for connection to any one or more of a variety of vertical tails, horizontal tails and canards. Vertical tails, horizontal tails and/or canards of different sizes, shapes, sweep angles, box chords, and/or root chords may connect to the fuselage without changing the structural layout or configuration of the fuselage structural interfaces.

23 Claims, 4 Drawing Sheets

FUSELAGE STRUCTURE FOR ACCOMMODATING TAILS AND CANARDS OF DIFFERENT SIZES AND SHAPES

BACKGROUND

Field

This disclosure relates generally airplanes having fuselage structures that can accommodate vertical tails, horizontal tails and canards of different structural configurations.

Background

The aft portion of an aircraft fuselage includes structural interfaces for connecting the aft portion to a vertical tail and/or to a horizontal tail. The vertical tail and the horizontal tail each include a front spar and a rear spar. Typically, the aft end of the fuselage will include four structural interfaces, including two structural interfaces for connection to the front and rear spars of the vertical tail and two structural interfaces for connection to the front and rear spars of the horizontal tail. The structural interfaces that connect the vertical tail to the fuselage are typically disposed along the top or crown of the fuselage. In contrast, the horizontal tail typically passes through the aft end of the fuselage and the interface used to connect the front spar of the horizontal tail to the fuselage is disposed along the centerline of the fuselage, typically at the jackscrew or the device used to adjust the trim of the horizontal tail. Further, the structural interface used to connect the rear spar of the horizontal tail to the fuselage is typically located at the side of body (SOB) of the fuselage in alignment with the pivot point or pivot interface, which connects to both sides (left and right) of the horizontal tail.

The forward portion of an aircraft fuselage may include structural interfaces for connecting the forward portion to a canard. The canard includes a front spar and a rear spar. The forward portion of the fuselage will include two structural interfaces (one per side, left and right) for connection to the front and rear spars of the canard. The structural interfaces that connect the canard to the fuselage are typically located at the side of body (SOB) of the fuselage.

When an aircraft manufacturer desires to change the vertical tail and/or the horizontal tail, such as the size, shape or sweep angle(s) of the tail or tail, the aft end of the fuselage must undergo significant modifications or redesign to accommodate a different vertical tail and/or a different horizontal tail. Similarly, when an aircraft manufacturer desires to change the canard, such as the size, shape, or sweep angle(s) of the canard, the forward end of the fuselage must undergo significant modifications or redesign to accommodate a different canard.

SUMMARY OF THE DISCLOSURE

An aircraft is disclosed which comprises a fuselage that comprises an aft portion. The aft portion comprises at least one front vertical structural interface and at least one rear vertical structural interface. The at least one front vertical structural interface is connected to a front spar of a first vertical tail or to a front spar of a second vertical tail. The at least one rear vertical structural interface is connected to a rear spar of the first vertical tail or to a rear spar of the second vertical tail. The first and second vertical tails are of different sizes.

Another aircraft is disclosed which also comprises a fuselage that comprises an aft portion. The fuselage is defined by a centerline that extends through the fuselage and a side of body (SOB) that surrounds the centerline. The aft portion includes at least one front horizontal structural interface and at least one rear horizontal structural interface. The at least one front horizontal structural interface is disposed along the centerline and the at least one rear horizontal structural interface is disposed at the SOB. The at least one front horizontal structural interface is connected to a front spar of a first horizontal tail or to a front spar of a second horizontal tail. The at least one rear horizontal structural interface is connected to a rear spar of the first horizontal tail or to a rear spar of the second horizontal tail. The first and second horizontal tails are of different sizes.

Another aircraft is disclosed which comprises a fuselage that comprises a forward portion. The fuselage is defined by a centerline that extends through the fuselage and a side of body (SOB) that surrounds the centerline. The forward portion includes at least one front canard structural interface and at least one rear canard structural interface. The at least one front canard structural interface is connected to a front spar of a first canard or to a front spar of a second canard. The at least one rear canard structural interface is connected to a rear spar of the first canard or to a rear spar of the second canard. The first and second canards are of different sizes.

A method of enhancing an aircraft is disclosed wherein the aircraft has a fuselage with an aft portion and a forward portion. The aircraft also includes one or more of a vertical tail, a horizontal tail and a canard. The method comprises, wherein if the aircraft has a vertical tail, providing the aft portion of the fuselage with at least one front vertical structural interface and at least one rear vertical structural interface, and wherein if the aircraft has a horizontal tail, providing the aft portion of the fuselage with at least one front horizontal structural interface and at least one rear horizontal structural interface, and wherein if the aircraft has a canard, providing the forward portion of the fuselage with at least one front canard structural interface and at least one rear canard structural interface.

The method further comprises making at least one enhancement to the aircraft selected from the group consisting of:

allowing the at least one front vertical structural interface to connect to a front spar of a first vertical tail and allowing the at least one rear vertical structural interface to connect to a rear spar of the first vertical tail or, in the alternative, allowing the at least one front vertical structural interface to connect to a front spar of a second vertical tail and allowing the at least one rear vertical structural interface to connect a rear spar of the second vertical tail, wherein the first and second vertical tails are of different sizes;

allowing the at least one front horizontal structural interface to connect to a front spar of a first horizontal tail and allowing the at least one rear horizontal structural interface to connect to a rear spar of the first horizontal tail or, in the alternative, allowing the at least one front horizontal structural interface to connect to a front spar of a second horizontal tail and allowing the at least one rear horizontal structural interface to connect to a rear spar of the second horizontal tail, wherein the first and second horizontal tails are of different sizes; and allowing the at least one front canard structural interface to connect to a front spar of a first canard and allowing the at least one rear canard structural interface to connect to a rear spar of the first canard or, in the alternative, allowing the at least one front canard structural interface to connect to a front spar of a second canard and allowing the at least one rear canard structural interface to connect to a rear spar of the second canard, wherein the first and second canards are of different sizes.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
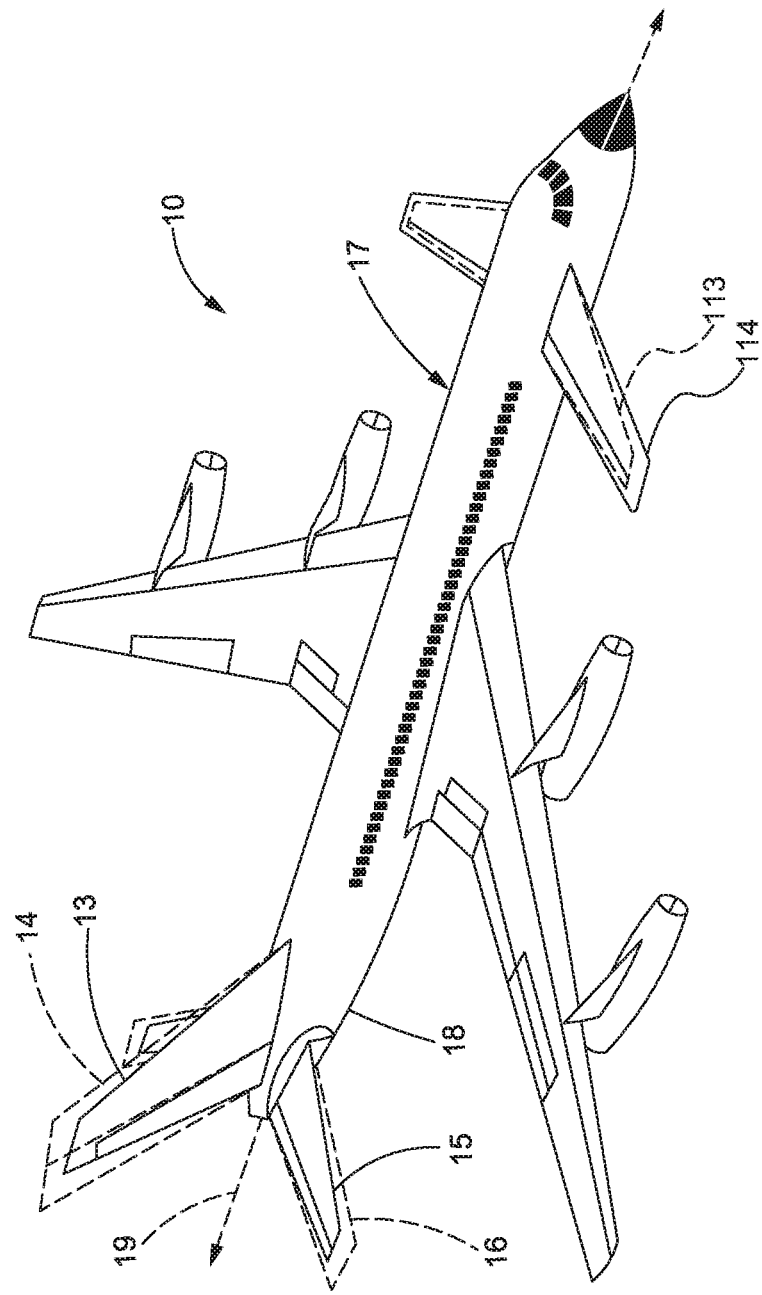
FIG. 1 schematically illustrates an aircraft capable of connection to different vertical tails, different horizontal tails and different canards.
Figure 2:
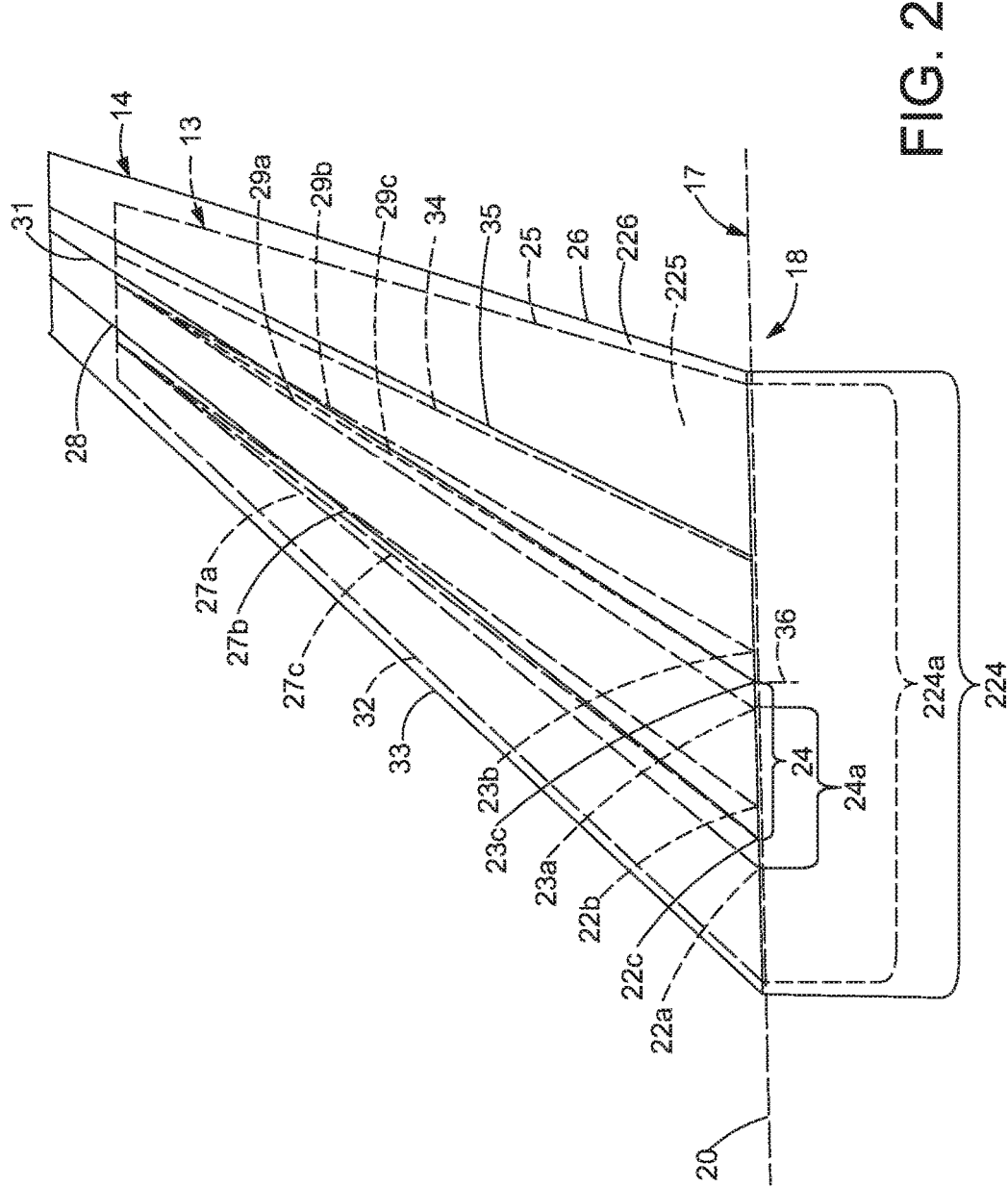
FIG. 2 schematically illustrates different vertical tails for connection to the aircraft of FIG. 1.
Figure 3:
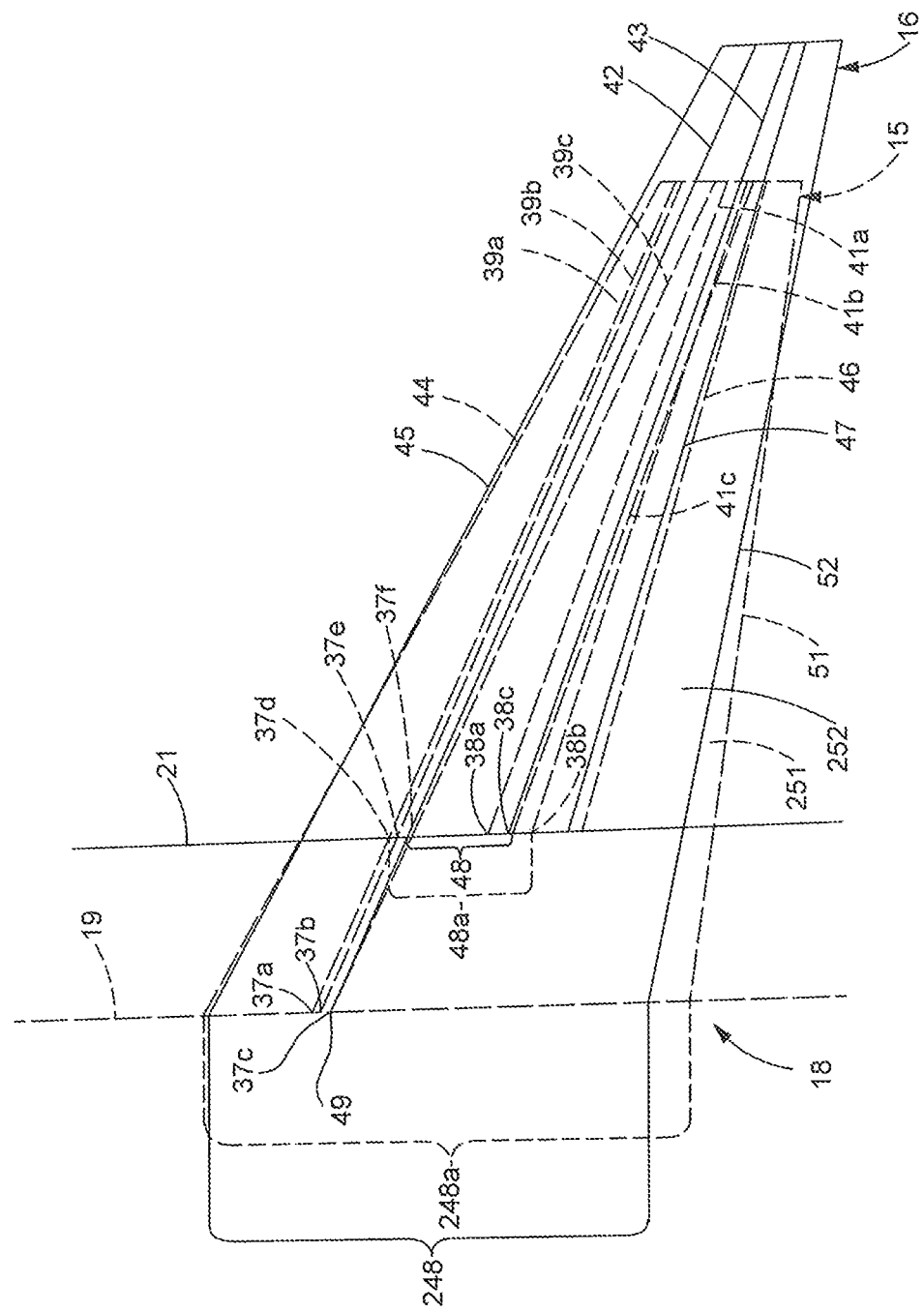
FIG. 3 schematically illustrates different horizontal tails for connection to the aircraft of FIG. 1.

FIGS. 1-3 illustrate an aircraft 10 that is capable of connection to different vertical tails 13, 14 and/or different horizontal tails 15, 16 and/or different canards 113, 113a, 114, 114a. As explained in detail below, the vertical tails 13, 14, the horizontal tails 15, 16 and the canards 113, 113a, 114, 114a may all differ in size and/or shape and/or sweep angles and/or box chords and/or root chords. In terms of different sizes for the vertical tails 13, 14, horizontal tails 15, 16 and canards 113, 113a, 114, 114a, the term "different size" shall not include adding a simple tip extension to either a vertical tail 13, 14, a horizontal tail 15, 16 or a canard 113, 113a, 114, 114a. In other words, a different size for a vertical tail 13, 14, horizontal tail 15, 16, or canard 113, 113a, 114, 114a cannot be accomplished for the purposes of this application by extending the existing leading edge and trailing edge lines to a different span, with no changes to the root chord, box chord, or leading/trailing edge sweep angles.

Further, the term "root chord" means the distance from the leading edge to the trailing edge at the fuselage interface and the term "box chord" means the distance from the front spar to the rear spar at the fuselage interface. In addition, vertical tails typically include a rudder and horizontal tails and canards typically include an elevator. The trailing edges of the rudders and elevators are referred to as "movable trailing edges" and the trailing edge of the main structure of a vertical tail, horizontal tail and canard is referred to as a "fixed trailing edge." However, some tails or canards may not have a rudder or elevator and therefore only one trailing edge, which moves or pivots with the rest of the structure. Therefore, the term trailing edge without the fixed or movable modifiers refers to both fixed and movable trailing edges.

As shown in FIG. 1, the aircraft 10 includes a fuselage 17 having an aft portion 18 and a forward portion 118. The fuselage 17 may include a crown 20 that extends along the top of the fuselage 17 as shown in FIG. 2. The fuselage 17 may also include a centerline 19 that extends through the fuselage 17 and a side of body (SOB) 21 that surrounds the centerline 19 as shown in FIG. 3. The aft portion 18 of the fuselage 17 may include a plurality of structural interfaces for connecting the aft portion 18 to one of a variety of vertical tails 13, 14 and/or for connecting the aft portion 18 to one of a variety of horizontal tails 15, 16. Similarly, the forward portion 118 may include a plurality of structural interfaces for connecting the forward portion 118 to a variety of canards 113, 113a, 114, 114a. The versatility provided by the aft and forward portions 18, 118 of the fuselage 17 enables aircraft designers to change vertical tails 13, 14, horizontal tails 15, 16 and/or canards 113, 113a, 114, 114a without a costly redesign of the structural layout of the aft and/or forward portions 18, 118 of the fuselage 17. While the drawings show only two vertical tails 13, 14, only two horizontal tails 15, 16, and only two pairs of canards 113, 113a, 114, 114a, those skilled in the art will realize that an infinite number of vertical tails, horizontal tails and canards of different shapes, sizes, sweep angles, box chords may be connected to the aft and forward portions 18, 118 of the fuselage 17, thereby enabling an aircraft designer to inexpensively provide a family of aircraft that have a common aft and forward portions 18, 118 but with different vertical tails 13, 14 and/or different horizontal tails 15, 16 and/or different canards 113, 113a, 114, 114a.

FIG. 2 illustrates two vertical tails 13, 14 that may be used with the aircraft 10. The first vertical tail 13 is illustrated in phantom lines and with three possible front spars 27a, 27b, 27c and three possible rear spars 29a, 29b, 29c. The second vertical tail 14 includes just a single front spar 28 and a single rear spar 31. As shown in FIG. 2, the vertical tails 13, 14 do not need to have a common box chord, a common root chord, or a common tip chord. The aft portion 18 of the fuselage 17 comprises at least one front vertical structural interface 22a, 22b, 22c and at least one rear vertical structural interface 23a, 23b, 23c.

In FIG. 2, three front vertical structural interfaces 22a, 22b, 22c are shown because the first vertical tail 13 is illustrated with three possible front spars 27a, 27b, 27c. Further, the front spar 28 of the second vertical tail 14, while meeting the front spar 27c at the front vertical structural interface 22c, does not need to be in alignment with the front spar 27c of the first vertical tail 13. In the example shown, even though the front spar 27c is not in alignment with the front spar 28, only one front vertical structural interface 22c is needed to accommodate both of these design choices. However, in the case where none of the front spars 27a, 27b, 27c of the first vertical tail 13 can share a structural interface 22a, 22b, 22c with the front spar 28 of the second vertical tail 14, then additional front vertical structural interfaces 22a, 22b, 22c would be needed to achieve the desired versatility. Similarly, in FIG. 2, three rear vertical structural interfaces 23a, 23b, 23c are shown because the first vertical tail 13 includes three possible rear spars 29a, 29b, 29c, and the rear spar 29c of the first vertical tail 13 shares a rear vertical structural interface 23c with the rear spar 31 of the second vertical tail 14 even though the rear spar 29c is not in alignment with the rear spar 31. Thus, only one front vertical structural interface 22c is needed to accommodate both of the rear spar 29c and the rear spar 31 of the vertical tails 13, 14 respectively. However, in the case where none of the rear spars 29a, 29b, 29c of the first vertical tail 13 can share a structural interface 23a, 23b, 23c with the rear spar 31 of the second vertical tail 14, then additional rear vertical structural interfaces 23a, 23b, 23c may be needed to achieve the desired versatility.

In the embodiment shown in FIG. 2, the at least one front vertical structural interface 22a, 22b, 22c connects to a front spar 27a, 27b, 27c of the first vertical tail 13 or to the front spar 28 of the second vertical tail 14. Similarly, the at least one rear vertical structural interface 23a, 23b, 23c connects to a rear spar 29a, 29b, 29c of the first vertical tail 13 or to the rear spar 31 of the second vertical tail 14. As shown in FIG. 2, the first and second vertical tails 13, 14 are of different sizes, however, the first and second vertical tails 13, 14 may also differ in other ways as well. Specifically, the front spars 27a, 27b, 27c, 28 of first and second vertical tails 13, 14 each define a sweep angle, and the rear spars 29a, 29b, 29c, 31 of the first and second vertical tails 13, 14 also each define a sweep angle. Further, the first and second vertical tails 13, 14 each have a leading edge 32, 33 that defines a sweep angle, the first and second vertical tails 13, 14 each have a movable trailing edge 25, 26 that defines a sweep angle, and the first and second vertical tails 13, 14 each have a fixed trailing edge 34, 35 that defines a sweep angle. In addition, the first and second vertical tails 13, 14 each include a vertical box chord 24a, 24 that may or may not be the same. For example, a different vertical box chord 24a for the vertical tail 13 is shown in FIG. 2. In an embodiment, in addition to different sizes or as an alternative to different sizes, the first and second vertical tails 13, 14 may have at least one structural difference selected from the group consisting of different sweep angles of the front spars 27a, 27b, 27c, 28, different sweep angles of the rear spars 29a, 29b, 29c, 31, different sweep angles of the leading edges 32, 33, different sweep angles of the movable trailing edges 25, 26, different sweep angles of the fixed trailing edges 34, 35, different vertical box chords 24a, 24, and/or different vertical root chords 224a, 224

The front and rear vertical structural interfaces 22a, 22b, 22c, 23a, 23b, 23c may be disposed at or along the crown 20 of the fuselage 17. Further, the front and rear vertical structural interfaces 22c, 23c may be separated by a vertical box chord 24 that may be common to both the first and second vertical tails 13, 14. While not required, the use of a common vertical box chord 24 for each vertical tail 13, 14 may reduce the number of structural interfaces required thereby reducing costs. Each vertical tail 13, 14 also may include a rudder 225, 226. The rear vertical structural interfaces 23a, 23b, 23c may be connected to a bulkhead 36 for purposes of strength and structural integrity.

In the embodiments shown in FIG. 2, the first and second vertical tails 13, 14 have different sweep angles for at least the front spars 27a, 27b, 27c, 28 and the rear spars 29a, 29b, 29c, 31, which illustrate the versatility of the disclosed embodiments. In another example, the first and second vertical tails 13, 14 each have a leading edge 32, 33 that defines a sweep angle, and the sweep angle of the leading edge 32 of the first vertical tail 13 is different from the sweep angle of the leading edge 33 of the second vertical tail 14. In yet another example, the first and second vertical tails 13, 14 each have a movable trailing edge 25, 26 that defines a sweep angle, and the sweep angle of the movable trailing edge 25 of the first vertical tail 13 is different from the sweep angle of the movable trailing edge 26 of the second vertical tail 14. Similarly, the first and second vertical tails 13, 14 each have a fixed trailing edge 34, 35 that defines a sweep angle, and the sweep angle of the fixed trailing edge 34 of the first vertical tail 13 is different from the sweep angle of the fixed trailing edge 35 of the second vertical tail 14. Thus, the aft portion 18 of the fuselage 17 is versatile and enables an aircraft designer to inexpensively provide a family of aircraft 10, each family member having a fuselage 17 with a common aft portion 18 that may accommodate vertical tails 13, 14 of different sizes that may also have different sweep angles at the leading edges 32, 33, different sweep angles at the movable trailing edges 25, 26, different sweep angles at the fixed trailing edges 34, 35, different sweep angles at the front spars 27a, 27b, 27c, 28 different sweep angles at the rear spars 29a, 29b, 29c, 31, different vertical box chords 24a, 24, and/or different vertical root chords 224a, 224.

In one design option, the front spar 27a, 27b of the first vertical tail 13 may connect to a first front vertical structural interface 22a, 22b while the front spar 28 of the second vertical tail 14 may connect to a second front vertical structural interface 22c, wherein the first front vertical structural interface 22a, 22b is different from the second front vertical structural interface 22c.

Similarly, the rear spar 29a, 29b of the first vertical tail 13 may connect to a first rear vertical structural interface 23a, 23b while the rear spar 31 of the second vertical tail 14 may connect to a second rear vertical structural interface 23c, wherein the first rear vertical structural interface 23a, 23b is different from the second rear vertical structural interface 23c.

Figure 4:
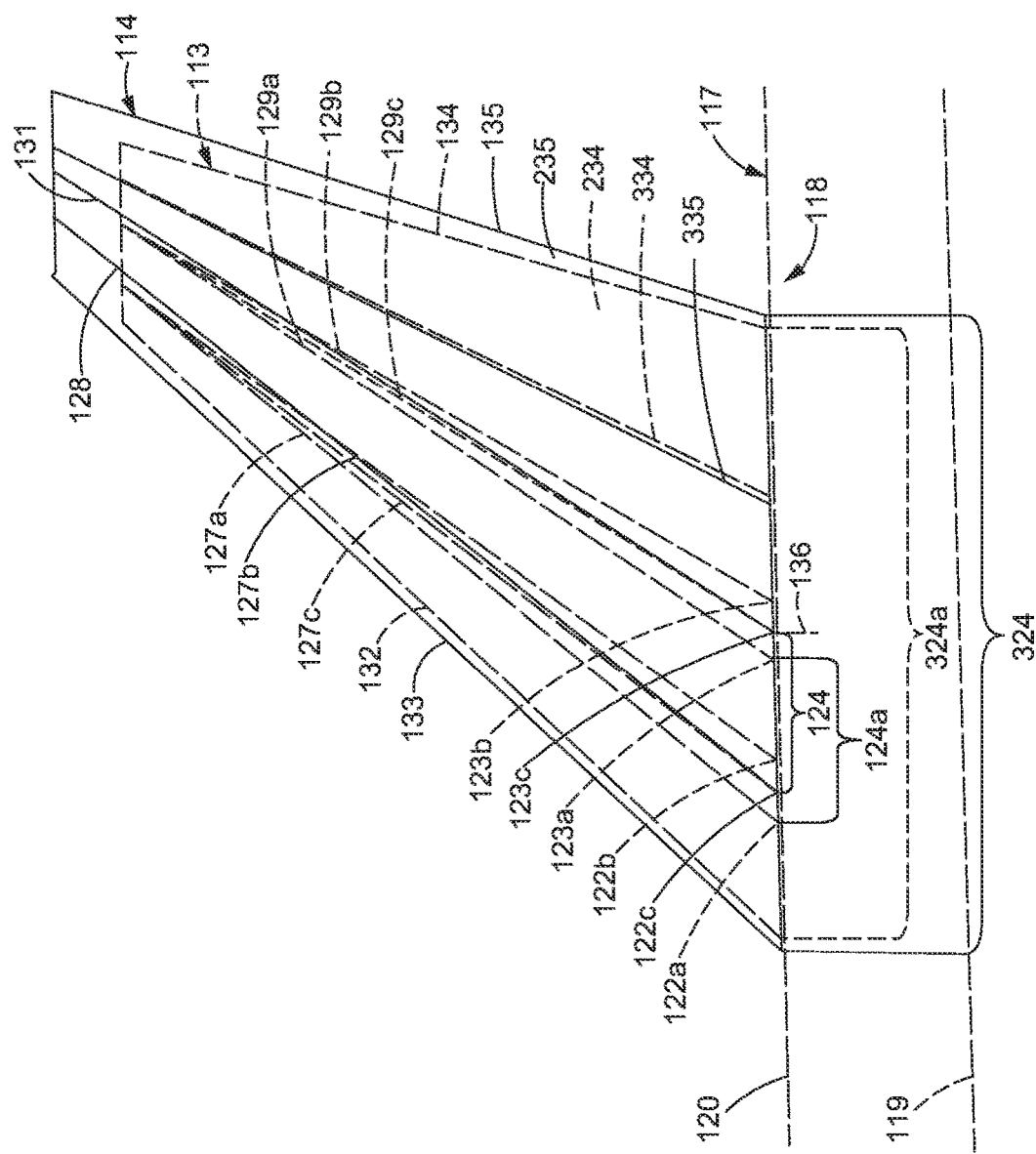
FIG. 4 schematically illustrates different canards for connection to the aircraft of FIG. 1.

FIG. 3 illustrates two horizontal tails 15, 16 for use with the aircraft 10 and, optionally, with the vertical tails 13, 14 of FIG. 2 and/or, optionally, with the canards 113, 113a, 114, 114a of FIG. 4. The aft portion 18 of the fuselage 17 includes at least one front horizontal structural interface 37a, 37b, 37c, 37d, 37e, 37f and at least one rear horizontal structural interface 38a, 38b, 38c. The at least one front horizontal structural interface 37a, 37b, 37c may be disposed along the centerline 19 of the fuselage 17. In a further embodiment, the at least one front horizontal structural interface 37d, 37e, 37f may be disposed at the SOB 21. The at least one rear horizontal structural interface 38a, 38b, 38c may be disposed at the SOB 21. The at least one front horizontal structural interface 37a, 37b, 37c, 37d, 37e, 37f connects to a front spar 39a, 39b, 39c of the first horizontal tail 15 or to a front spar 42 of the second horizontal tail 15. Further, the at least one rear horizontal structural interface 38a, 38b, 38c connects to a rear spar 41a, 41b, 41c of the first horizontal tail 15 or to a rear spar 43 of the second horizontal tail 16. In the embodiment shown in FIGS. 1 and 3, the first and second horizontal tails 15, 16 are of different sizes, but the horizontal tails 15, 16 may also have one or more structural difference selected from the group consisting of shape, sweep angles of the leading edges 44, 45, sweep angles of the movable trailing edges 51, 52, sweep angles of the fixed trailing edges 46, 47, sweep angles of the front spars 39a, 39b, 39c, 42, sweep angles of the rear spars 41a, 41b, 41c, 43, the horizontal box chords 48, 48a, and/or the horizontal root chords 248a, 248 Multiple combinations are possible.

For example, the first and second horizontal tails 15, 16 may have different sweep angles for at least one of the front spars 39a, 39b, 39c, 42 and/or the rear spars 41a, 41b, 41c, 43. In addition, the first and second horizontal tails 15, 16 may each have a leading edge 44, 45 that defines a sweep angle wherein the sweep angle of the leading edge 44 of the first horizontal tail 15 is different from the sweep angle of the leading edge 45 of the second horizontal tail 16. In another example, the first and second horizontal tails 15, 16 may each have a movable trailing edge 51, 52 that defines a sweep angle and wherein the sweep angle of the movable trailing edge 51 of the first horizontal tail 15 is different from the sweep angle of the movable trailing edge 52 of the second horizontal tail 16. In another example, the first and second horizontal tails 15, 16 may each have a fixed trailing edge 46, 47 that defines a sweep angle and wherein the sweep angle of the fixed trailing edge 46 of the first horizontal tail 15 is different from the sweep angle of the fixed trailing edge 47 of the second horizontal tail 16. In another example, when the first horizontal tail 15 includes the front spar 39a and the rear spar 41b, the spars 39a, 41b are separated by the horizontal box chord 48a. However, the front spars 39c, 42 and the rear spars 41c, 43 of the first and second horizontal tails 15, 16 are separated by a common horizontal box chord 48 as shown in FIG. 3. In another example, the aircraft 10 includes a jackscrew interface 49 and the at least one front horizontal structural interface 37a, 37b, 37c of the aircraft 10 is in alignment with and/or connected to the jackscrew interface 49.

The front and rear horizontal structural interfaces 37a, 37b, 37c, 37d, 37e, 37f, 38a, 38b, 38c may be separated by a horizontal box chord 48 that may be common to both the first and second horizontal tails 15, 16. While not required, the use of a common horizontal box chord 48 for each horizontal tail 15, 16 may reduce the number of structural interfaces required thereby reducing costs. Each horizontal tail 15, 16 also may include an elevator 251, 252. The rear canard structural interfaces 123a, 123b, 123c may be connected to a bulkhead 136 for purposes of strength and structural integrity.

In one embodiment, one of the front horizontal structural interfaces 37a, 37b, 37c, 37d, 37e, 37f connects to a front spar 39a, 39b, 39c of the first horizontal tail 15 while a different front horizontal structural interface 37a, 37b, 37c, 37d, 37e, 37f connects to a front spar 42 of the second horizontal tail 16. Similarly, in an embodiment, one of the rear horizontal structural interfaces 38a, 38b, 38c connects to the rear spar 41a, 41b, 41c of the first horizontal tail 15 while a different rear horizontal structural interface 38a, 38b, 38c connects to the rear spar 43 of the second horizontal tail 16.

FIG. 4 illustrates three front canard structural interfaces 122a, 122b, 122c because the first canard 113 is illustrated with three possible front spars 127a, 127b, 127c. The first and second canards 113, 114 are equipped with elevators 234, 235. Further, the front spar 128 of the second canard 114, while meeting the front spar 127c at the front canard structural interface 122c, does not need to be in alignment with the front spar 127c of the first canard 113. In the example shown, even though the front spar 127c is not in alignment with the front spar 128, only one front canard structural interface 122c is needed to accommodate both of these design choices. However, in the case where none of the front spars 127a, 127b, 127c of the first canard 113 can share a canard structural interface 122a, 122b, 122c with the front spar 128 of the second canard 114, then additional front canard structural interfaces 122a, 122b, 122c would be needed to achieve the desired versatility. Similarly, in FIG. 4, three rear canard structural interfaces 123a, 123b, 123c are shown because the first canard 113 includes three possible rear spars 129a, 129b, 129c, and the rear spar 129c of the first canard 113 shares a rear canard structural interface 123c with the rear spar 131 of the second canard 114 even though the rear spar 129c is not in alignment with the rear spar 131. Thus, only one rear canard structural interface 122c is needed to accommodate both of the rear spar 129c and the rear spar 131 of the canards 113, 114 respectively. However, in the case where none of the rear spars 129a, 129b, 129c of the first canard 113 can share a rear canard structural interface 123a, 123b, 123c with the rear spar 131 of the second canard 114, then additional rear canard structural interfaces 123a, 123b, 123c may be needed to achieve the desired versatility.

In the embodiment shown in FIG. 4, the at least one front canard structural interface 122a, 122b, 122c connects to a front spar 127a, 127b, 127c of the first canard 113 or to the front spar 128 of the second canard 114. Similarly, the at least one rear canard structural interface 123a, 123b, 123c connects to a rear spar 129a, 129b, 129c of the first canard 113 or to the rear spar 131 of the second canard 114. As shown in FIG. 4, the first and second canards 113, 114 are of different sizes, however, the first and second canards 113, 114 may also differ in other ways as well. Specifically, the front spars 127a, 127b, 127c, 128 of first and second canards 113, 114 each define a sweep angle, and the rear spars 129a, 129b, 129c, 131 of the first and second canards 113, 114 also each define a sweep angle. Further, the first and second canards 113, 114 each have a leading edge 132, 133 that defines a sweep angle, the first and second canards 113, 114 each have a fixed trailing edge 334, 335 and a movable trailing edge 134, 135 that each defines a sweep angle, and the first and second canards 113, 114 each have a fixed trailing edge 334, 335 and a movable trailing edge 134, 135 that each defines a sweep angle. In addition, the first and second canards 113, 114 each include a canard box chord 124a, 124 that may or may not be the same. For example, a different canard box chord 124a for the canard 113 is shown in FIG. 4. In an embodiment, in addition to different sizes or as an alternative to different sizes, the first and second canards 113, 114 may have at least one structural difference selected from the group consisting of different sweep angles of the front spars 127a, 127b, 127c, 128, different sweep angles of the rear spars 129a, 129b, 129c, 131, different sweep angles of the leading edges 132, 133, different sweep angles of the fixed trailing edges 334, 335, different sweep angles of the movable trailing edges 134, 135, different canard box chords 124a, 124, and/or different canard root chords 324a, 324.

The front and rear canard structural interfaces 122c, 123c may be separated by a canard box chord 124 that may be common to both the first and second canards 113, 114. While not required, the use of a common canard box chord 124 for each canard 113, 114 may reduce the number of structural interfaces required thereby reducing costs. Each canard 113, 114 also may include an elevator 235, 234. The rear canard structural interfaces 123a, 123b, 123c may be connected to a bulkhead 136 for purposes of strength and structural integrity.

In the embodiments shown in FIG. 4, the first and second canards 113, 114 have different sweep angles for at least the front spars 127a, 127b, 127c, 128 and the rear spars 129a, 129b, 129c, 131, which illustrate the versatility of the disclosed embodiments. In another example, the first and second canards 113, 114 each have a leading edge 132, 133 that defines a sweep angle and the sweep angle of the leading edge 132 of the first canard 113 is different from the sweep angle of the leading edge 133 of the second canard 114. In yet another example, the first and second canards 113, 114 each have a movable trailing edge 134, 135 that defines a sweep angle and the sweep angle of the movable trailing edge 134 of the first canard 113 is different from the sweep angle of the movable trailing edge 135 of the second canard 114. Similarly, the first and second canards 113, 114 each have a fixed trailing edge 334, 335 that defines a sweep angle, and the sweep angle of the fixed trailing edge 334 of the first canard 113 is different from the sweep angle of the fixed trailing edge 335 of the second canard 114. Thus, the forward portion 118 of the fuselage 17 is versatile and enables an aircraft designer to inexpensively provide a family of aircraft 10, each family member having a fuselage 17 with a common forward portion 118 that may accommodate canards 113, 114 of different sizes that may also have different sweep angles at the leading edges 132, 133, different sweep angles at the movable trailing edges 134, 135, different sweep angles at the fixed trailing edges 334, 335, different sweep angles at the front spars 127a, 127b, 127c, 128, different sweep angles at the rear spars 129a, 129b, 129c, 131, different canard box chords 124a, 124, and/or different canard root chords 324a, 324.

In one design option, the front spar 127a, 127b of the first canard 113 may connect to a first front canard structural interface 122a, 122b while the front spar 128 of the second canard 114 may connect to a second front canard structural interface 122c, wherein the first front canard structural interface 122a, 122b is different from the second front canard structural interface 122c.

Similarly, the rear spar 129a, 129b of the first canard 113 may connect to a first rear canard structural interface 123a, 123b while the rear spar 131 of the second canard 114 may connect to a second rear canard structural interface 123c, wherein the first rear canard structural interface 123a, 123b is different from the second rear canard structural interface 123c.

A method of enhancing an aircraft 10 having a fuselage 17 with an aft portion 18 and a forward portion 118. The aircraft 10 also includes one or more of a vertical tail 13, 14, a horizontal tail, 15, 16 and a canard 113, 114. The method comprises, wherein if the aircraft 10 has a vertical tail 13, 14, providing the aft portion 18 of the fuselage 17 with at least one front vertical structural interface 22a, 22b, 22c and at least one rear vertical structural interface 23a, 23b, 23c. And, wherein if the aircraft 10 has a horizontal tail 15, 16, providing the aft portion 18 of the fuselage 17 with at least one front horizontal structural interface 37a, 37b, 37c and at least one rear horizontal structural interface 38a, 38b, 38c. And, wherein if the aircraft 10 has a canard 113, 114, providing the forward portion 118 of the fuselage 17 with at least one front canard structural interface 122a, 122b, 122c and at least one rear canard structural interface 123a, 123b, 123c. The method further comprises making at least one enhancement to the aircraft 10 selected from the group consisting of:

allowing the at least one front vertical structural interface 22a, 22b, 22c to connect to a front spar 27a, 27b, 27c of a first vertical tail 13 and allowing the at least one rear vertical structural interface 23a, 23b, 23c to connect to a rear spar 29a, 29b, 29c of the first vertical tail 13 or, in the alternative, allowing the at least one front vertical structural interface 22a, 22b, 22c to connect to a front spar 28 of a second vertical tail 14 and allowing the at least one rear vertical structural interface 23a, 23b, 23c to connect a rear spar 31 of the second vertical tail 14, wherein the first and second vertical tails 13, 14 are of different sizes;

allowing the at least one front horizontal structural interface 37a, 37b, 37c to connect to a front spar 39a, 39b, 39c of a first horizontal tail 15 and allowing the at least one rear horizontal structural interface 38a, 38b, 38c to connect to a rear spar 41a, 41b, 41c of the first horizontal tail 15 or, in the alternative, allowing the at least one front horizontal structural interface 37a, 37b, 37c to connect to a front spar 42 of a second horizontal tail 16 and allowing the at least one rear horizontal structural interface 38a, 38b, 38c to connect to a rear spar 43 of the second horizontal tail 16, wherein the first and second horizontal tails 15, 16 are of different sizes; and allowing the at least one front canard structural interface 122a, 122b, 122c to connect to a front spar 127a, 127b, 127c of a first canard 113 and allowing the at least one rear canard structural interface 123a, 123b, 123c to connect to a rear spar 129a, 129b, 129c of the first canard 113 or, in the alternative, allowing the at least one front canard structural interface 122a, 122b, 122c to connect to a front spar 128 of a second canard 114 and allowing the at least one rear canard structural interface 123a, 123b, 123c to connect to a rear spar 131 of the second canard 114, wherein the first and second canards 113, 114 are of different sizes.

The differences between the vertical tails 13, 14 may improve the performance of the aircraft 10 in addition to reducing manufacturing costs. The front spars 27a, 27b, 27c, 28 of the first and second vertical tails 13, 14 each define a sweep angle, while the rear spars 29a, 29b, 29c, 31 of the first and second vertical tails 13, 14 each define a sweep angle. Further, the first and second vertical tails 13, 14 each have a leading edge 32, 33 that defines a sweep angle, the first and second vertical tails 13, 14 each have a movable trailing edge 25, 26 that defines a sweep angle, and the first and second vertical tails 13, 14 each have a fixed trailing edge 34, 35 that defines a sweep angle. The first and second vertical tails 13, 14 each further include a vertical box chord 24a, 24. The first and second vertical tails 13, 14 may have at least one structural difference selected from the group consisting of: different sizes; different sweep angles of the front spars 27a, 27b, 27c, 28; different sweep angles of the rear spars 29a, 29b, 29c, 31; different sweep angles of the leading edges 32, 33; different sweep angles of the movable trailing edges 25, 26; different sweep angles of the fixed trailing edges 34, 35; different vertical box chords 24a, 24a; and/or different vertical root chords 224a, 224. Thus, the optimum vertical tail 13, 14 may be selected based on a variety of criteria, which may improve the performance of the aircraft 10 as well as reducing its cost.

The differences between the horizontal tails 15, 16 may also improve the performance or operation of the aircraft 10 in addition to reducing manufacturing costs. For example, the front spars 39a, 39b, 39c, 42 of the first and second horizontal tails 15, 16 each define a sweep angle, while the rear spars 41a, 41b, 41c, 43 of the first and second horizontal tails 15, 16 each define a sweep angle. Further, the first and second horizontal tails 15, 16 each have a leading edge 44, 45 that defines a sweep angle, the first and second horizontal tails 15, 16 each have a fixed trailing edge 46, 47 that defines a sweep angle, and the first and second horizontal tails 15, 16 each have a movable trailing edge 51, 52 that defines a sweep angle. The first and second horizontal tails 15, 16 may have at least one structural difference selected from the group consisting of different sizes; different sweep angles of the front spars 39a, 39b, 39c, 42; different sweep angles of the rear spars 41a, 41b, 41c, 43; different sweep angles of the leading edges 44, 45; different sweep angles of the fixed trailing edges 46, 47; different sweep angles of the movable trailing edges 51, 52; different horizontal box chords 48a, 48; and/or different horizontal root chords 248a, 248.

The differences between the canards 113, 114, if utilized, may improve the performance of the aircraft 10 in addition to reducing manufacturing costs. The front spars 127a, 127b, 127c, 128 of the first and second canards 113, 114 each define a sweep angle, while the rear spars 129a, 129b, 129c, 131 of the first and second canards 113, 114 each define a sweep angle. Further, the first and second canards 113, 114 each have a leading edge 132, 133 that defines a sweep angle, the first and second canards 113, 114 each have a movable trailing edge 134, 135 that defines a sweep angle, and the first and second canards 113, 114 each have a fixed trailing edge 334, 335 that defines a sweep angle. The first and second canards 113, 114 each further include a canard box chord 124a, 124. The first and second canards 113, 114 may have at least one structural difference selected from the group consisting of different sizes; different sweep angles of the front spars 127a, 127b, 127c, 128; different sweep angles of the rear spars 129a, 129b, 129c, 131; different sweep angles of the leading edges 132, 133; different sweep angles of the movable trailing edges 134, 135; different sweep angles of the fixed trailing edges 334, 335, different canard box chords 124a, 124; and/or different canard root chords 324a, 324.

Thus, various aircraft 10 and a method of enhancing the performance of the aircraft 10 are disclosed in addition to reducing manufacturing costs. The aft portion 18 of the fuselage 17 is designed to be versatile so it may be connected to one of a variety of vertical tails 13, 14 and/or to one of a variety of horizontal tails 15, 16 without the need to redesign or reconfigure the structural layout of the aft portion 18 of the fuselage 17. Similarly, the forward portion 118 of the fuselage is also designed to be versatile so it may be connected to a variety of canards 113, 114. This versatility can be exploited by selecting vertical tails 13, 14, horizontal tails 15, 16 and/or canards 113, 114 that will enhance the performance of the aircraft. A family of aircraft 10 may be provided using fuselages 17 having a common aft portion 18 that is equipped with a configuration of four or more structural interfaces 22a, 22b, 22c, 23a, 23b, 23c, 37a, 37b, 37c, 37d, 37e, 37f, 38a, 38b, 38c that enable the aft portion 18 to be connected to a variety of different vertical tails 13, 14 and/or a variety of horizontal tails 15, 16. The versatility described herein may result in reduced manufacturing costs in addition to improved aircraft performance.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. An aircraft comprising:
   a fuselage comprising an aft portion,
   the aft portion including at least one front vertical structural interface and at least one rear vertical structural interface,
   the at least one front vertical structural interface connected to a front spar of a first vertical tail or to a front spar of a second vertical tail,
   the at least one rear vertical structural interface connected to a rear spar of a first vertical tail or to a rear spar of a second vertical tail,
   wherein the first and second vertical tails are of different sizes.

2. The aircraft of claim 1, wherein the front spars of the first and second vertical tails each define a sweep angle, the rear spars of the first and second vertical tails each define a sweep angle, the first and second vertical tails each have a leading edge that defines a sweep angle, the first and second vertical tails each have at least one trailing edge that defines a sweep angle, the first and second vertical tails each have a vertical box chord, the first and second vertical tails each have a vertical root chord,
   wherein the first and second vertical tails have at least one structural difference selected from the group consisting of different sweep angles of the front spars, different sweep angles of the rear spars, different sweep angles of the leading edges, different sweep angles of the trailing edges, different vertical box chords, and different vertical root chords.

3. The aircraft of claim 1 wherein the front spar of the first vertical tail is connected to a first front vertical structural interface and the front spar of the second vertical tail is connected to a second front vertical structural interface, the first front vertical structural interface being different from the second front vertical structural interface.

4. The aircraft of claim 1 wherein the rear spar of the first vertical tail is connected to a first rear vertical structural interface and the rear spar of the second vertical tail is connected to a second rear vertical structural interface, the first rear vertical structural interface being different from the second rear vertical structural interface.

5. The aircraft of claim 1 wherein the aft portion of the fuselage includes at least one front horizontal structural interface and at least one rear horizontal structural interface,
   the at least one front horizontal structural interface connected to a front spar of a first horizontal tail or to a front spar of a second horizontal tail,
   the at least one rear horizontal structural interface connected to a rear spar of the first horizontal tail or to a rear spar of the second horizontal tail,
   wherein the front spars of the first and second horizontal tails each define a sweep angle, the rear spars of the first and second horizontal tails each define a sweep angle, the first and second horizontal tails each have a leading edge that defines a sweep angle, the first and second horizontal tails each have at least one trailing edge that each defines a sweep angle, the first and second horizontal tails each have a horizontal box chord, the first and second horizontal tails each have a horizontal root chord, and the first and second horizontal tails each have a size,
   wherein the first and second horizontal tails have at least one structural difference selected from the group consisting of different sweep angles of the front spars, different sweep angles of the rear spars, different sweep angles of the leading edges, different sweep angles of the trailing edges, different horizontal box chords, different horizontal root chords, and/or different sizes.

6. The aircraft of claim 5 wherein the front spar of the first horizontal tail is connected to a first front horizontal structural interface and the front spar of the second horizontal tail is connected to a second front horizontal structural interface, the first front horizontal structural interface being different from the second front horizontal structural interface.

7. The aircraft of claim 5 wherein the rear spar of the first horizontal tail is connected to a first rear horizontal structural interface and the rear spar of the second horizontal tail is connected to a second rear horizontal structural interface, the first rear horizontal structural interface being different from the second rear horizontal structural interface.

8. The aircraft of claim 1 wherein the fuselage further comprises a forward portion,
   the forward portion including at least one front canard structural interface and at least one rear canard structural interface,
   the at least one front canard structural interface connected to a front spar of a first canard or to a front spar of a second canard,
   the at least one rear canard structural interface connected to a rear spar of the first canard or to a rear spar of the second canard, wherein the front spars of the first and second canards each define a sweep angle, the rear spars of the first and second canards each define a sweep angle, the first and second canards each have a leading edge that defines a sweep angle, the first and second canards each have at least one trailing edge that each defines a sweep angle, the first and second canards each have a canard box chord, the first and second canards each have a canard root chord, and the first and second canards each have a size, wherein the first and second canards have at least one structural difference selected from the group consisting of different sweep angles of the front spars, different sweep angles of the rear spars, different sweep angles of the leading edges, different sweep angles of the trailing edges, different canard box chords, different canard root chords, and/or different sizes.

9. The aircraft of claim 8 wherein the front spar of the first canard is connected to a first front canard structural interface and the front spar of the second canard is connected to a second front canard structural interface, the first front canard structural interface being different from the second front canard structural interface.

10. The aircraft of claim 8 wherein the rear spar of the first canard is connected to a first rear canard structural interface and the rear spar of the second canard is connected to a second rear canard structural interface, the first rear canard structural interface being different from the second rear canard structural interface.

11. An aircraft comprising:
a fuselage comprising an aft portion,
the aft portion including at least one front horizontal structural interface and at least one rear horizontal structural interface,
the at least one front horizontal structural interface connected to a front spar of a first horizontal tail or to a front spar of a second horizontal tail,
the at least one rear horizontal structural interface connected to a rear spar of the first horizontal tail or to a rear spar of the second horizontal tail,
wherein the first and second horizontal tails are of different sizes.

12. The aircraft of claim 11 wherein the front spars of the first and second horizontal tails each define a sweep angle, the rear spars of the first and second horizontal tails each define a sweep angle, the first and second horizontal tails each have a leading edge that defines a sweep angle, the first and second horizontal tails each have at least one trailing edge that each defines a sweep angle, the first and second horizontal tails each have a horizontal box chord, the first and second horizontal tails each have a horizontal root chord, wherein the first and second horizontal tails have at least one structural difference selected from the group consisting of different sweep angles of the front spars, different sweep angles of the rear spars, different sweep angles of the leading edges, different sweep angles of the trailing edges, different horizontal box chords, and/or different horizontal root chords.

13. The aircraft of claim 11 wherein the front spar of the first horizontal tail is connected to a first front horizontal structural interface and the front spar of the second horizontal tail is connected to a second front horizontal structural interface, the first front horizontal structural interface being different from the second front horizontal structural interface.

14. The aircraft of claim 11 wherein the rear spar of the first horizontal tail is connected to a first rear horizontal structural interface and the rear spar of the second horizontal tail is connected to a second rear horizontal structural interface, the first rear horizontal structural interface being different from the second rear horizontal structural interface.

15. The aircraft of claim 11 wherein the aft portion of the fuselage includes at least one front vertical structural interface and at least one rear vertical structural interface,
the at least one front vertical structural interface connected to a front spar of a first vertical tail or to a front spar of a second vertical tail,
the at least one rear vertical structural interface connected to a rear spar of the first vertical tail or to a rear spar of the second vertical tail,
wherein the front spars of first and second vertical tails each define a sweep angle, the rear spars of the first and second vertical tails each define a sweep angle, the first and second vertical tails each have a leading edge that defines a sweep angle, the first and second vertical tails each have at least one trailing edge that each defines a sweep angle, the first and second vertical tails each have a vertical box chord, the first and second vertical tails each have a vertical root chord, the first and second vertical tails each have a size,
wherein the first and second vertical tails have at least one structural difference selected from the group consisting of different sweep angles of the front spars, different sweep angles of the rear spars, different sweep angles of the leading edges, different sweep angles of the trailing edges, different vertical box chords, different vertical root chords, and/or different sizes.

16. The aircraft of claim 11 wherein the fuselage further comprises a forward portion that includes at least one front canard structural interface and at least one rear canard structural interface,
the at least one front canard structural interface connected to a front spar of a first canard or to a front spar of a second canard,
the at least one rear canard structural interface connected to a rear spar of the first canard or to a rear spar of the second canard,
wherein the front spars of the first and second canards each define a sweep angle, the rear spars of the first and second canards each define a sweep angle, the first and second canards each have a leading edge that defines a sweep angle, the first and second canards each have at least one trailing edge that each defines a sweep angle, the first and second canards each have a canard box chord, the first and second canards each have a canard root chord, the first and second canards each have a size,
wherein the first and second canards have at least one structural difference selected from the group consisting of different sweep angles of the front spars, different sweep angles of the rear spars, different sweep angles of the leading edges, different sweep angles of the trailing edges, different canard box chords, different canard root chords, and/or different sizes.

17. An aircraft comprising:
a fuselage comprising a forward portion that includes at least one front canard structural interface and at least one rear canard structural interface,
the at least one front canard structural interface connected to a front spar of a first canard or to a front spar of a second canard, the at least one rear canard structural interface connected to a rear spar of the first canard or to a rear spar of the second canard,
wherein the first and second canards are of different sizes.

18. The aircraft of claim 17 wherein the front spars of first and second canards each define a sweep angle, the rear spars of the first and second canards each define a sweep angle, the first and second canards each have a leading edge that defines a sweep angle, the first and second canards each have at least one trailing edge that each defines a sweep angle, the first and second canards each have a canard box chord, the first and second canards each have a horizontal root chord,
wherein the first and second canards have at least one structural difference selected from the group consisting of different sweep angles of the front spars, different sweep angles of the rear spars, different sweep angles of the leading edges, different sweep angles of the trailing edges, different canard box chords, and/or different canard root chords.

19. The aircraft of claim 17 wherein the front spar of the first canard is connected to a first front canard structural interface and the front spar of the second canard is connected to a second front canard structural interface, the first front canard structural interface being different from the second front canard structural interface.

20. The aircraft of claim 17 wherein the rear spar of the first canard is connected to a first rear canard structural interface and the rear spar of the second canard is connected to a second rear canard structural interface, the first rear canard structural interface being different from the second rear canard structural interface.

21. The aircraft of claim 17 wherein the fuselage further comprises an aft portion that includes at least one front vertical structural interface and at least one rear vertical structural interface,
the at least one front vertical structural interface connected to a front spar of a first vertical tail or to a front spar of a second vertical tail,
the at least one rear vertical structural interface connected to a rear spar of the first vertical tail or to a rear spar of the second vertical tail,
wherein the front spars of the first and second vertical tails each define a sweep angle, the rear spars of the first and second vertical tails each define a sweep angle, the first and second vertical tails each have a leading edge that defines a sweep angle, the first and second vertical tails each have at least one trailing edge that each defines a sweep angle, the first and second vertical tails each have a vertical box chord, the first and second vertical tails each have a vertical root chord, the first and second vertical tails each have a size,
wherein the first and second vertical tails have at least one structural difference selected from the group consisting of different sweep angles of the front spars, different sweep angles of the rear spars, different sweep angles of the leading edges, different sweep angles of the trailing edges, different vertical box chords, different vertical root chords, and/or different sizes.

22. The aircraft of claim 17 wherein the fuselage further comprises an aft portion that includes at least one front horizontal structural interface and at least one rear horizontal structural interface,
the at least one front horizontal structural interface connected to a front spar of a first horizontal tail or to a front spar of a second horizontal tail,
the at least one rear horizontal structural interface connected to a rear spar of the first horizontal tail or to a rear spar of the second horizontal tail,
wherein the front spars of the first and second horizontal tails each define a sweep angle, the rear spars of the first and second horizontal tails each define a sweep angle, the first and second horizontal tails each have a leading edge that defines a sweep angle, the first and second horizontal tails each have at least one trailing edge that each defines a sweep angle, the first and second horizontal tails each have a horizontal box chord, the first and second horizontal tails each have a horizontal root chord, and the first and second horizontal tails each have a size,
wherein the first and second horizontal tails have at least one structural difference selected from the group consisting of different sweep angles of the front spars, different sweep angles of the rear spars, different sweep angles of the leading edges, different sweep angles of the trailing edges, different horizontal box chords, different horizontal root chords, and/or different sizes.

23. A method of enhancing an aircraft having a fuselage with an aft portion and a forward portion, the aircraft including one or more of a vertical tail, a horizontal tail and a canard, the method comprising:
wherein if the aircraft has a vertical tail, providing the aft portion of the fuselage with at least one front vertical structural interface and at least one rear vertical structural interface,
wherein if the aircraft has a horizontal tail, providing the aft portion of the fuselage with at least one front horizontal structural interface and at least one rear horizontal structural interface,
wherein if the aircraft has a canard, providing the forward portion of the fuselage with at least one front canard structural interface and at least one rear canard structural interface,
the method further comprising making at least one enhancement to the aircraft selected from the group consisting of:
allowing the at least one front vertical structural interface to connect to a front spar of a first vertical tail and allowing the at least one rear vertical structural interface to connect to a rear spar of the first vertical tail or, in the alternative, allowing the at least one front vertical structural interface to connect to a front spar of a second vertical tail and allowing the at least one rear vertical structural interface to connect a rear spar of the second vertical tail, wherein the first and second vertical tails are of different sizes;
allowing the at least one front horizontal structural interface to connect to a front spar of a first horizontal tail and allowing the at least one rear horizontal structural interface to connect to a rear spar of the first horizontal tail or, in the alternative, allowing the at least one front horizontal structural interface to connect to a front spar of a second horizontal tail and allowing the at least one rear horizontal structural interface to connect to a rear spar of the second horizontal tail, wherein the first and second horizontal tails are of different sizes; and
allowing the at least one front canard structural interface to connect to a front spar of a first canard and allowing the at least one rear canard structural interface to connect to a rear spar of the first canard or, in the alternative, allowing the at least one front canard structural interface to connect to a front spar of a second canard and allowing the at least one rear canard structural interface to connect to a rear spar of the second canard, wherein the first and second canards are of different sizes.

\* \* \* \* \*